INVENTOR.
ROBERT BEACOM
KARL P. SCHUBERT
BY Woodling and Krost,
ATTORNEYS

Sept. 17, 1963 R. BEACOM ET AL 3,103,838
TWO-SPEED SPINDLE
Filed May 27, 1960 5 Sheets-Sheet 3

INVENTOR.
ROBERT BEACOM
KARL P. SCHUBERT
BY Woodling and Krost,
ATTORNEYS

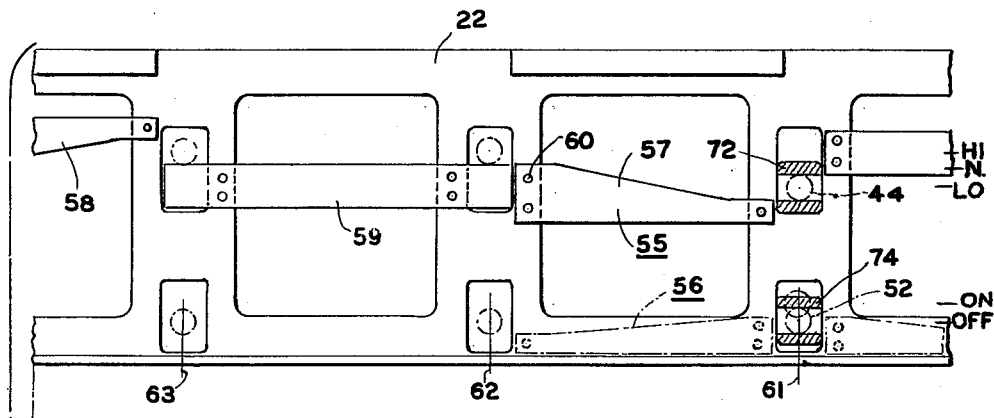
FIG. 5
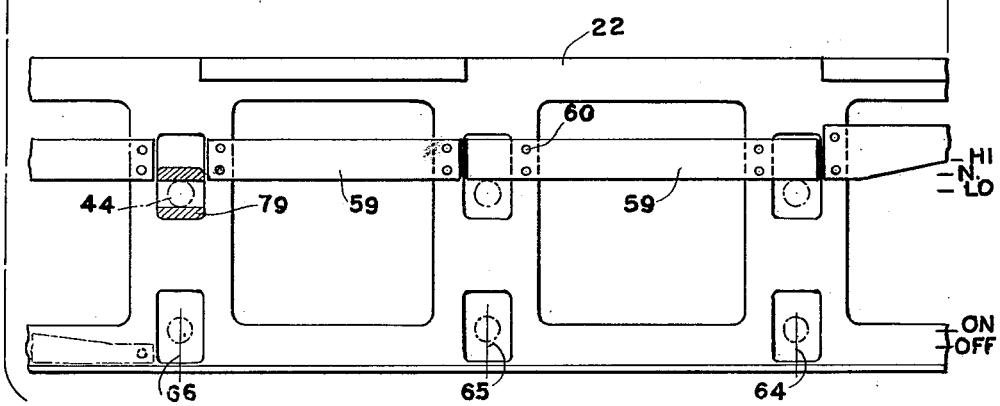

United States Patent Office 3,103,838
Patented Sept. 17, 1963

3,103,838
TWO-SPEED SPINDLE
Robert Beacom, Bedford, and Karl P. Schubert, Cleveland Heights, Ohio, assignors to The National Acme Company, a corporation of Ohio
Filed May 27, 1960, Ser. No. 32,344
3 Claims. (Cl. 82—28)

The invention relates in general to a two-speed spindle arrangement on a machine tool and more particularly to provide two speeds of spindles on a multiple spindle machine tool.

Multiple spindle machine tools have been used for many years for both bar and chucking applications and these have been single spindle speed types which although the spindle speeds may be changed by change gears, nevertheless, the gearing once established will provide only a single spindle speed for each of the multiple spindles for any given machining operation. Many times because of the nature of the machining work being done, such as machining a large and a small diameter concurrently on two different spindles, it is desirable to reduce the speed of a particular spindle and in the past it has been necessary to reduce the speed of all spindles to that selected speed, and accordingly, the speeds of all other spindles suffer. This reduces efficiency and utilization of the particular machine tool by increasing the cycle time of the machine tool.

Accordingly, an object of the invention is to provide a multiple spindle machine tool with a means for automatically changing the speed of the spindles.

Another object of the invention is to provide a multiple spindle machine tool with a means to selectively change the speed of any given spindle as well as to brake or stop any particular spindle.

Another object of the invention is to provide a multiple spindle machine tool with first and second alternative spindle speeds which may be selected either during indexing of the spindle carrier or while at rest at a particular spindle indexable position.

Another object of the invention is to provide means to selectively actuate clutches to selectively engage different power trains to spindles of a multiple spindle machine tool.

Another object of the invention is to provide both cam and fluid cylinder means to change the speed of a spindle in a machine tool.

Another object of the invention is to provide both cam and fluid cylinder means to actuate a spindle brake in a machine tool.

Another object of the invention is to provide either a cam or a fluid cylinder for actuation of clutch and brake means either during movement of or during the rest condition of a spindle carrier of a multiple spindle machine tool.

Other objects and a fuller understanding of this invention may be had by referring to the following description and claims, taken in conjunction with the accompanying drawings, in which:

FIGURE 5 is a developed view of the cam mechanism;

Figure 1:
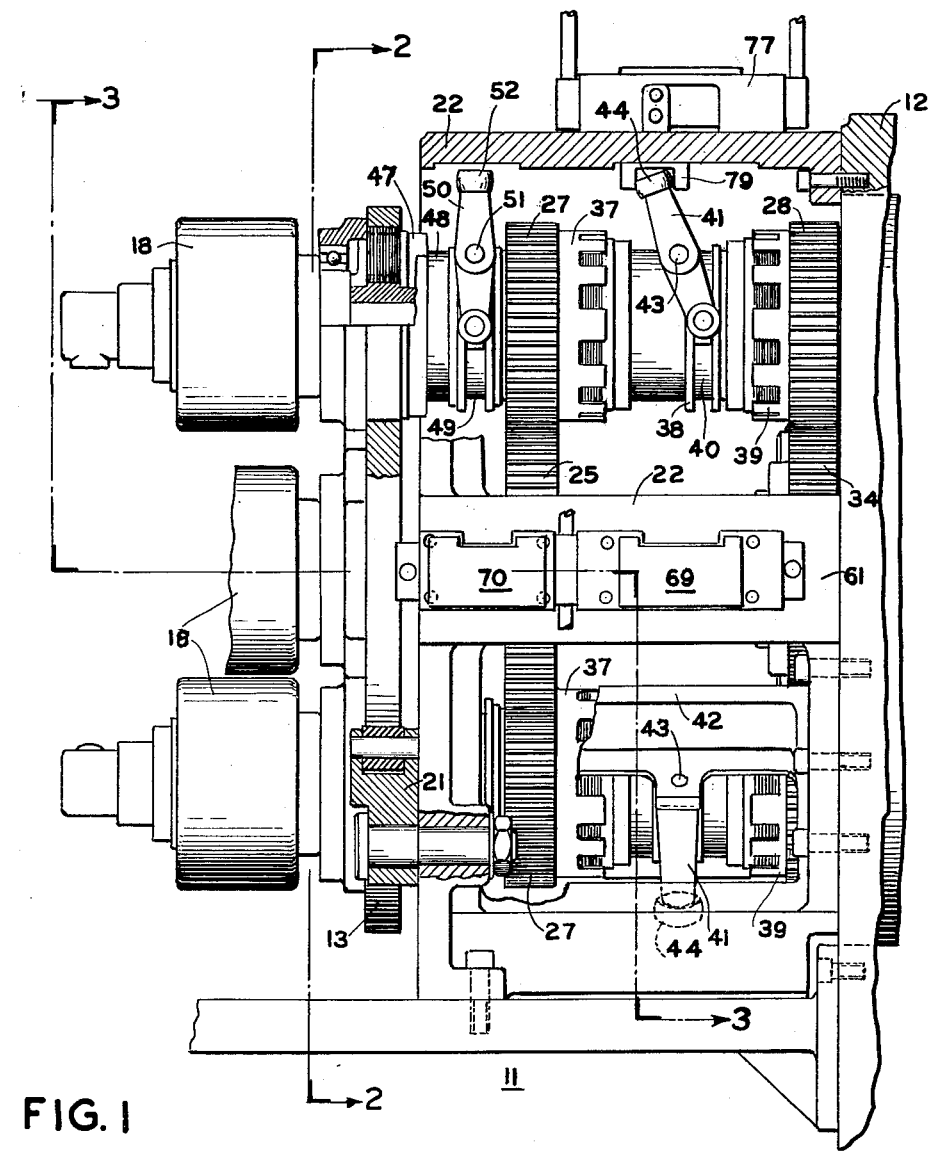
FIGURE 1 is a side elevation view, partly in section, on line 1—1 of FIGURE 2 of a part of a multiple spindle machine tool embodying the invention.

The figures of the drawing show a multiple spindle machine tool 11 having a frame 12 which journals a spindle carrier 13. This spindle carrier in turn journals a plurality of spindle shafts 14, in this case shown as being six in number, although any plurality may be used. The spindle carrier also has a central shaft 15 coaxial with the spindle carrier axis 16 and this central shaft 15 is driven from some drive means shown as a motor 17. The machine tool may be either a bar or a chucking machine, but has been shown as being a chucking machine utilizing hydraulic cylinders 18 on the rear end of the spindle shafts 14 to actuate the spindle chucks, not shown.

The rear of the spindle carrier 14 overhangs the frame 12, and accordingly, journal brackets 21 are carried on a stationary cage 22 in turn fastened to the frame 12 to support the overhanging end of the spindle carrier 13.

The central shaft 15 carries first and second drive gears 25 and 26 driven from this central shaft. Each spindle shaft journals first and second driven gears 27 and 28 driven from the first and second drive gears 25 and 26, respectively. Each of the first driven gears 27 is directly in mesh with the first drive gear 25 for a high speed power train to the respective spindle shaft. The second drive gear 26 is a part of an epicyclic gear train 30 which includes planet gears 31 meshing with gear 26 and also meshing with an internal ring gear 33 fixed to the spindle carrier 13. A spider 32 journals the planet gears 31 and carries an external ring gear 34 which meshes with each of the second driven gears 28 to provide a low-speed power train from the central shaft 15 to each of the spindle shafts. This low-speed gear train drives the spindle shafts in the same direction as the high-speed gear train.

A first clutch member 37 is provided on each spindle shaft and acts between the first driven gear 27 and a clutch sleeve 38. A second clutch member 39 is also provided on each spindle shaft and acts between the second driven gear 28 and the clutch sleeve 38. Each of the clutch sleeves 38 is slidably keyed to the respective spindle shaft 14. Each clutch sleeve has a peripheral groove 40 engaged by the yoke end of a first yoke lever 41 which also may be termed a clutch yoke lever. A spider 42 is fixedly attached to the spindle carrier 13 and carries the pivots 43 for the plurality of levers 41. Each of these levers has an outwardly extending operating roller end 44.

A brake member 47 is carried on each of the spindle shafts 14 and acts between the spindle carrier 13 and a brake sleeve 48 slidably keyed on each of the spindle shafts. Each of these brake sleeves has a peripheral groove 49 in which the yoke end of a second or brake yoke lever 50 is engaged. Each of the brake levers 50 are pivoted at 51 on the spider 42 and each has an external operating roller end 52.

The roller ends 44 and 52 extend radially outwardly from the spindle carrier 13 into close proximity to the interior surface of the circular stationary cage 22. FIGURE 5 shows a developed view of the interior of this stationary cage 22 and first and second cam means 55 and 56 are adapted to be fastened to the interior surface of this cage 22. The multiple spindle machine tool 11 has been shown as having six indexable spindle positions 61–66, respectively, and at each of these spindle positions there will be located one of the operating rollers 44 and 52 for the clutch and brake levers. These operating rollers are adapted to cooperate with the first and second cam means 55 and 56, respectively, during indexing of the spindle carrier 13 to selectively change the speed of each spindle from high to low or to a neutral position and to selectively brake each spindle.

Figure 3:
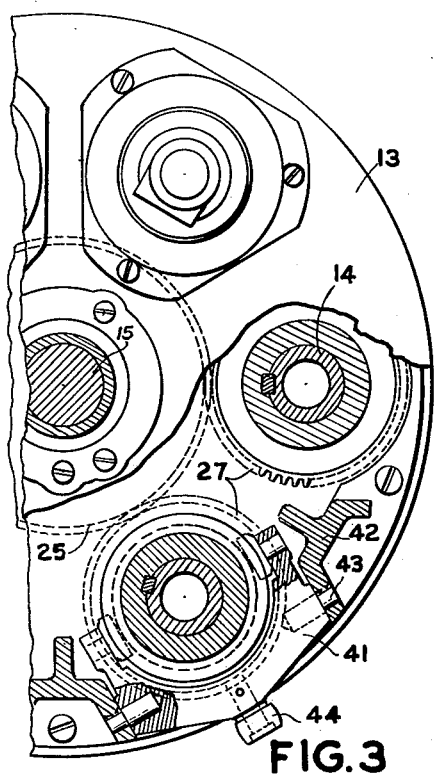
FIGURE 3 is a sectional view on line 3—3 of FIGURE 4.
Figure 4:
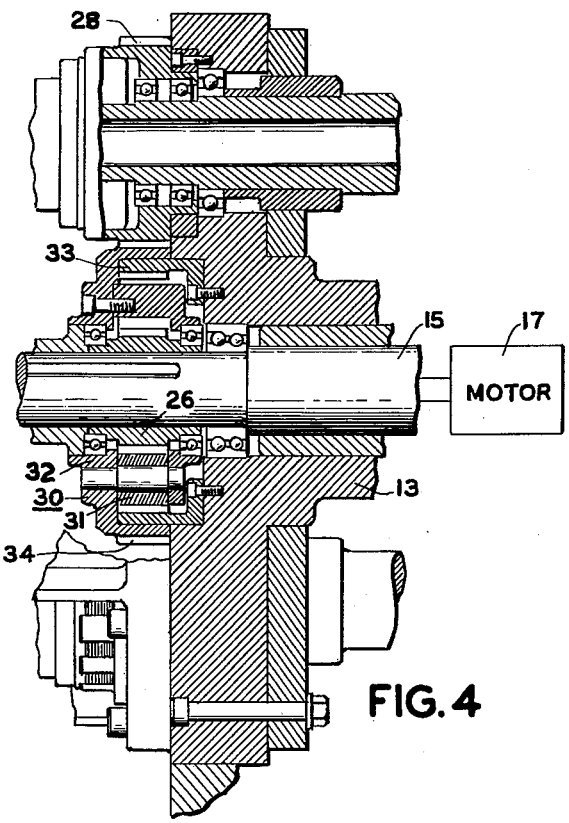
FIGURE 4 is a sectional view through the low-speed power train.
Figure 6:
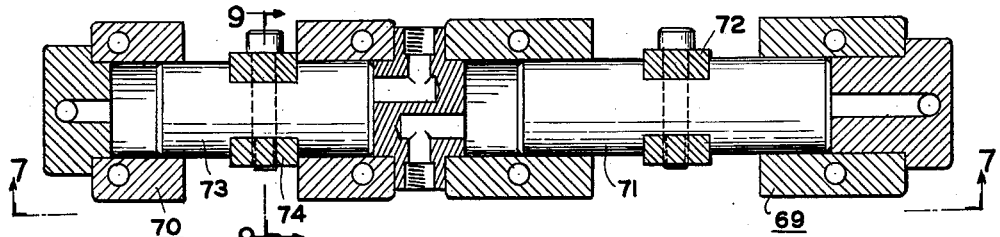
FIGURE 6 is a sectional view on line 6—6 of FIGURE 7 of the brake and clutch actuating cylinders used in one spindle position.
Figure 7:
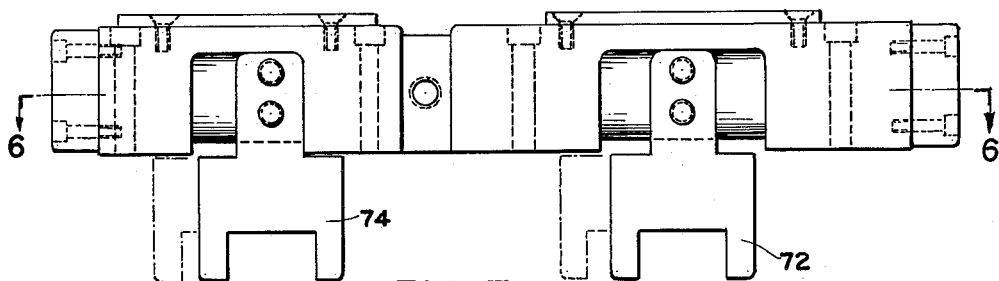
FIGURE 7 is a side view on line 7—7 of FIGURE 6 of the cylinders of FIGURE 6.
Figure 9:
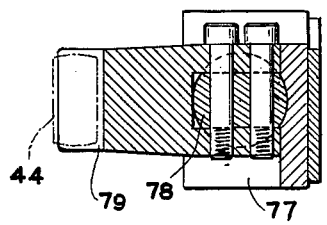
FIGURE 9 is a sectional view taken on line 9—9 of FIGURE 8.

Mounting surfaces 68 are provided on the exterior surface of the stationary cage 22 at each of the indexable positions to mount fluid cylinders. First and second fluid cylinders 69 and 70 are shown in FIGURES 1 and 6 to actuate the clutches and brakes at the corresponding spindle positions. In FIGURE 1 these have been shown as being in the first spindle position 61, and in FIGURE 3 this is the three o'clock position. The first fluid cylinder 69 has a piston 71 carrying an actuating yoke 72 to actuate one of the clutch lever rollers 44. The second fluid cylinder 70 has a piston 73 carrying a yoke 74 to actuate one of the brake lever rollers 52. FIGURE 5 shows these actuating yokes 72 and 74 as embracing the respective rollers 44 and 52 at the first spindle position 61.

Figure 2:
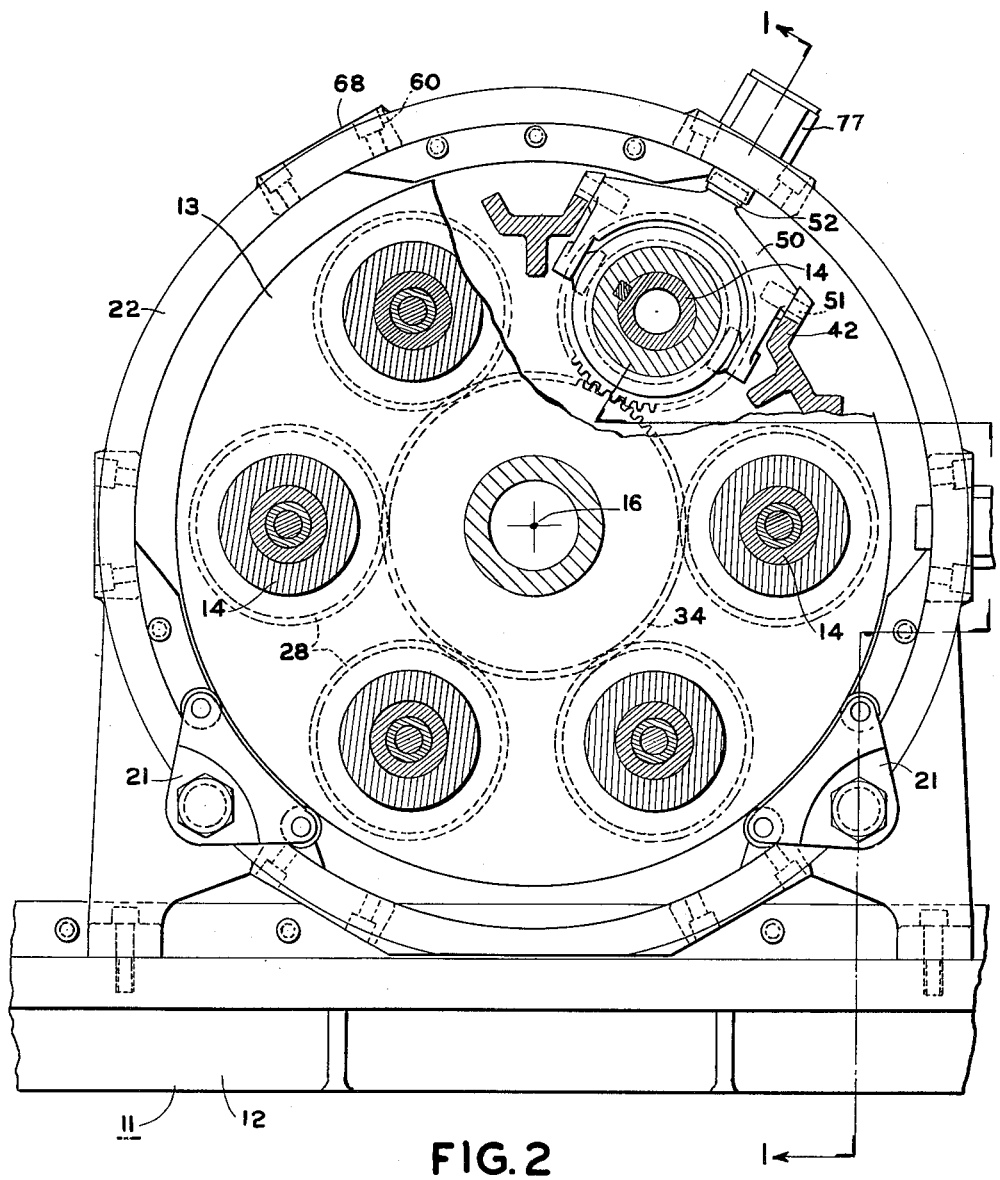
FIGURE 2 is a sectional view on line 2—2 of FIGURE 1.
Figure 8:
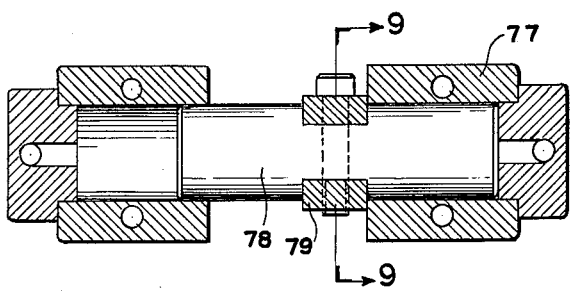
FIGURE 8 is a sectional view of the clutch actuating cylinder used in another spindle position.

The sixth spindle position is the one shown at the top of FIGURE 1 and is at the one o'clock position in FIGURE 2. This sixth spindle position 66 is provided with another form of fluid cylinder means shown as a fluid cylinder 77. This cylinder is also shown in FIGURE 8 and it contains a piston 78 carrying a yoke 79 to actuate any one of the operating rollers 44 on the clutch levers 41.

The developed view of FIGURE 5 shows the clutch actuating yoke 72 and the brake actuating yoke 74 in the first spindle position 61. Accordingly, they are in position to actuate the clutch lever roller 44 and the brake lever roller 52 to actuate the clutch and brake of the particular spindle that is in the first spindle position 61 at that time. Also FIGURE 5 shows the yoke 79 actuated by the cylinder 77 in the sixth spindle position 66 to actuate the clutch lever roller 44 which happens to be in the sixth spindle position at that time. The fluid cylinders 69, 70, and 77 are therefore capable of selectably actuating the clutches and brakes whenever the spindle carrier is in one of its indexable positions.

The first cam means 55 may include cams of various shapes to shift the clutches among low, neutral, and high positions. A cam bar 57 is shown as a part of the first cam means 55 and extends between the first and second spindle positions 61 and 62. Therefore, as the spindle carrier is indexed, the clutch lever 41, which in that instant is moving from the first to the second spindle position, is actuated from the low speed to the high speed position. This means that formerly the low speed clutch 39 was engaged as shown in FIGURE 1 and next the high speed clutch 37 is engaged at the second spindle position 62. This first cam means 55 may also include a cam bar 58 between the third and fourth spindle positions 63 and 64 to shift the speed from high back to low. Also safety bars 59 may be bolted to the stationary cage 22 at bolt holes 60, the same as the bolt holes for mounting the cam bars 57 and 58. The clutches 37 and 39 and the brake 47 may be provided with some internal mechanism to maintain the clutch engaged once the associated lever is moved to the engaged position; however, the safety bars 59 may be provided to make sure that the clutch or brake remains in the selected position while the spindle carrier 13 is indexed.

The second cam means 56 has been shown in phantom because in the particular machine tool set-up shown, such second cam means is not used, rather only the fluid cylinder 70 is used to brake in the spindle in the first spindle position 61. This may be for the purpose of braking the spindle to unload the finished workpiece and load a new workpiece blank. The phantom lines for the second cam means 56 show that such cam means may be used from the sixth to the first spindle positions 66 to 61 to actuate the brake and then to disengage this brake as the spindle carrier is indexed from the first to the second position 61 and 62. This then would be an alternative to the use of the cylinder 70 to brake the spindle in the first spindle position.

Figure 10:
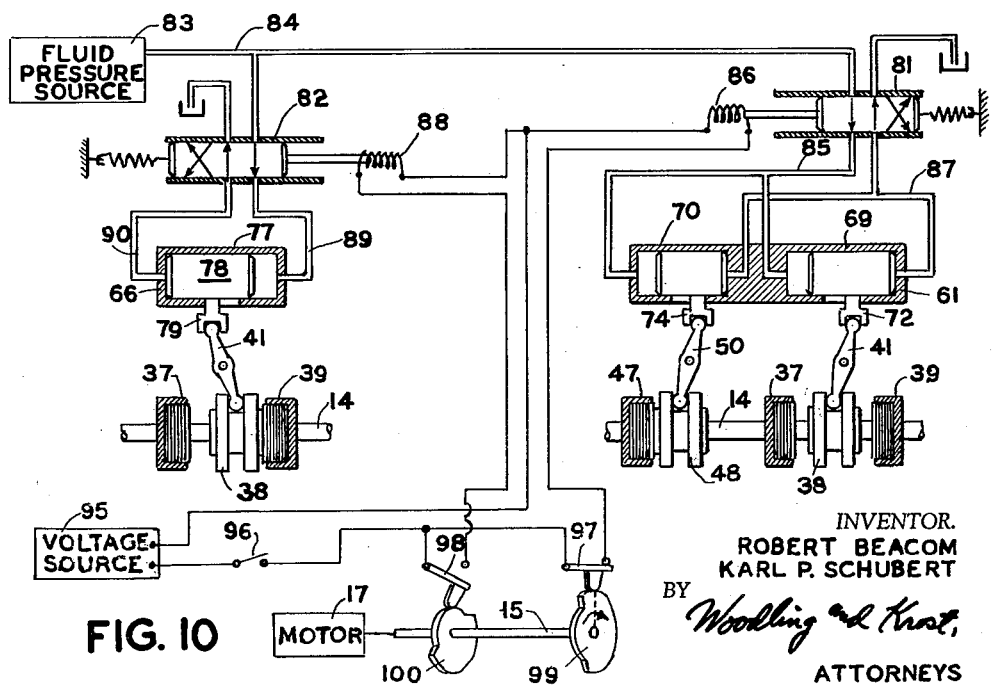
FIGURE 10 is a schematic diagram of the electrical and hydraulic system used in the machine tool.

FIGURE 10 shows schematically the hydraulic and electrical circuit, and at the right hand side of this figure, a spindle shaft 14 is shown positioned at the first spindle position 61 whereat the fluid cylinders 69 and 70 are located. At the left side of this figure, a spindle shaft 14 is shown at the sixth spindle position 66 whereat the fluid cylinder 77 is located. A four-way valve 81 is associated with the cylinders 69 and 70 and another four-way valve 82 is associated with the cylinder 77. A fluid pressure source 83 supplies fluid under pressure to an inlet conduit 84 and this leads through the four-way valve 81 in the unactuated position to a conduit 85 supplying pressure to the left end of cylinders 69 and 70, to actuate the brake sleeve 48 to the left and to actuate the clutch sleeve 38 leftwardly to the neutral position. In this neutral position, neither the high nor the low speed clutches 37 and 39 are engaged. A solenoid 86 is connected to actuate the four-way valve 81 to the left, whereat pressure fluid enters a conduit 87 to enter the right end of the cylinders 69 and 70 to actuate the clutch and brake sleeves 38 and 48 to the right. In this positioin, the brake 47 is disengaged and the low speed clutch 39 is engaged. A solenoid 88 is connected to actuate the four-way valve 82. When this four-way valve 82 is in the position shown in FIGURE 10, pressure fluid is admitted to conduit 89 and to the right end of cylinder 77 to actuate the clutch sleeve 38 to the right to engage the low speed clutch 39. When the solenoid 88 is energized, the four-way valve 88 is actuated to the right admitting pressure fluid through conduit 90 to the left end of cylinder 77 actuating the clutch sleeve 38 to the left to engage the high speed clutch 37.

The electrical portion of the diagram of FIGURE 10 includes a voltage source 95 which is connected through a main switch 96 to first and second cam switches 97 and 98 and through these respective switches to the solenoids 86 and 88 and return to the voltage source 95. The first cam switch 97 is controlled by a first programming cam 99 and the second cam switch 98 is controlled by a second programming cam 100 rotated from the motor 17 in a gear ratio such that these cams have one revolution per working cycle of the machine tool 11. These cams are shown approximately in their zero position at the start of a particular working cycle, and accordingly, when the main switch 96 is closed, the solenoid 86 will be energized, which as previously described, establishes the brake 47 disengaged and the low speed clutch 39 engaged for the first spindle position 31. The programming cams 99 and 100 rotate clockwise and, therefore, shortly after a particular spindle has reached the first spindle position, the programming cam 99 will open the first cam switch 97 to disengage the low speed clutch 39 and to brake the spindle shaft 14 in this first spindle position. The finished workpiece may then be unloaded and a new unfinished blank loaded in the spindle. This may be accomplished during the low lobe on the programming cam 99. During the last portion of the working cycle, the programming cam 99 closes the switch 97 so that the brake is released and the low speed clutch 39 is again engaged. This permits some machining to be performed at this first spindle position which otherwise could not be accomplished if the second cam means 56 were to be used.

The second programming cam 100 controls the spindle in the sixth spindle position 66 and this cam 100 closes the cam switch 98 after a predetermined portion of the working cycle, and accordingly, the associated spindle in the sixth spindle position changes from low speed to high speed. This might be very desirable, for example, where the diameter of the workpiece being machined changed considerably from a large diameter to a small diameter. This change of spindle speed maintains much more constant the surface cutting speed on the workpiece and permits cutting at a surface speed which is much more closely related to the ideal cutting speed for good finish. The programming cam 100 shows that the cam switch 98 may again be opened while the same work cycle is being performed, and accordingly, the spindle speed will be returned to the low speed condition. This control by the programming cam 100 and the cylinder 77 thus permits greater flexibility by permitting changes of spindle speeds while a particular spindle is at a definite spindle indexible position. Accordingly, this has greater flexibility than merely changing spindle speeds between the indexible positions, as by the cam means 55.

Both the clutch members 37 and the brake members 47 may be multiple disc friction members or friction means which selectably render the low speed and high speed power trains engageable and brake the spindle shafts. The cam means 55 and 56 plus the fluid cylinders 69, 70 and 79 provide means to selectively actuate the clutches and brakes, and accordingly, select either high or low speed or a braked condition of a selected spindle shaft.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a multiple spindle machine tool the provision of, in combination, a frame, a spindle carrier indexable on said frame, a plurality of spindle shafts in said spindle carrier, a central shaft in said spindle carrier, means for driving said central shaft, a first clutch member on each said spindle shaft having an output connected to the respective spindle shaft and having an input, a second clutch member on each said spindle shaft having an output connected to the respective spindle shaft and having an input, a first power train from said central shaft to the input of each of said first clutch members, a second power train from said central shaft to the input of each of said second clutch members to rotate said second clutch members in the same direction of rotation as said first clutch members but at a slower speed, a clutch lever pivoted on said spindle carrier and connected to each said clutch member, a separate brake member acting between each said spindle shaft and said spindle carrier, a brake lever pivoted on said spindle carrier and connected to each said brake member to brake the respective spindle shaft, first and second cam means cooperating with said clutch and brake levers, respectively, upon indexing of said spindle carrier to actuate selectively each of said clutch and brake levers to selectively change the speed and to brake each spindle shaft, and first and second fluid cylinders at at least one of the spindle indexable positions to actuate said clutch and brake levers when said carrier has indexed to the corresponding position.

2. In a multiple spindle machine tool the provision of, in combination, a frame, a spindle carrier indexable on said frame, a plurality of spindle shafts in said spindle carrier, a central shaft in said spindle carrier, means for driving said central shaft, first and second drive gears fixed on said central shaft, a first driven gear journalled on each said spindle shaft and meshing with said first drive gear, a second driven gear journalled on each said spindle shaft, an epicyclic gear train driven from said second drive gear and driving each said second driven gears in the same direction of rotation as said first driven gears but at a different speed, a clutch sleeve slidably keyed to each said spindle shaft, a first clutch member connected between said clutch sleeve and said first driven gear on each said spindle shaft, a second clutch member connected between said clutch sleeve and said second driven gear on each said spindle shaft, a clutch yoke lever pivoted on said spindle carrier and connected to each said clutch sleeve, a brake sleeve slidably keyed to each said spindle shaft, a separate brake member acting between each said brake sleeve and said spindle carrier, a brake yoke lever pivoted on said spindle carrier and connected to each said brake member to brake the respective spindle shaft, each of said yoke levers sliding in a groove in the respective sleeve and being pivoted relative to said spindle carrier, each of said yoke levers having an outer end carrying an operating roller, first and second cam means coopertaing with the operating rollers of each of said clutch and brake levers, respectively, upon indexing of said spindle carrier to actuate selectively each of said clutch and brake levers to selectively change the speed and to brake each spindle, and first and second fluid cylinders at one of the spindle indexable positions to actuate the operating rollers of said clutch and brake levers when said carrier has indexed to the corresponding position.

3. In a multiple spindle machine tool the provision of, in combination, a frame, a spindle carrier indexable on said frame, a plurality of spindle shafts in said spindle carrier, a central shaft in said spindle carrier, means for driving said central shaft, first and second drive gears fixed on said central shaft, a first driven gear journalled on each said spindle shaft and meshing with said first drive gear, a second driven gear journalled on each said spindle shaft, an epicyclic gear train driven from said second drive gear and driving each said second driven gear in the same direction of rotation as said first driven gears but at a slower speed, a clutch sleeve slidably keyed to each said spindle shaft, a first clutch member connected between said clutch sleeve and said first driven gear on each said spindle shaft, a second clutch member connected between said clutch sleeve and said second driven gear on each said spindle shaft, a clutch yoke lever pivoted on said spindle carrier and connected to each said clutch sleeve, a brake sleeve slidably keyed to each said spindle shaft, a brake member acting between each said brake sleeve and said spindle carrier, a separate brake yoke lever pivoted on said spindle carrier and connected to each said brake member to brake the respective spindle shaft, each of said yoke levers sliding in a groove in the respective sleeve, each of said yoke levers having an outer end carrying an operating roller, first and second fixed cam means on said frame cooperating with the operating rollers of each of said clutch and brake levers, respectively, upon indexing of said spindle carrier to actuate selectively each of said clutch and brake levers to selectively change the speed and to brake each spindle, and first and second fluid cylinders fixed on said frame at one of the spindle indexable positions to actuate the operating rollers of said clutch and brake levers during nonrotative conditions of said spindle carrier when said carrier has indexed to the corresponding position.

References Cited in the file of this patent
UNITED STATES PATENTS

| | | |
|---|---|---|
| 2,033,490 | Simpson et al. | Mar. 19, 1936 |
| 2,646,152 | Retz | July 21, 1953 |
| 2,876,527 | Matlachowsky | Mar. 10, 1959 |